July 31, 1928.

H. C. McEWEN

BELT TIGHTENER

Filed Jan. 14, 1926

INVENTOR
HORACE C. McEWEN
BY ATTORNEY

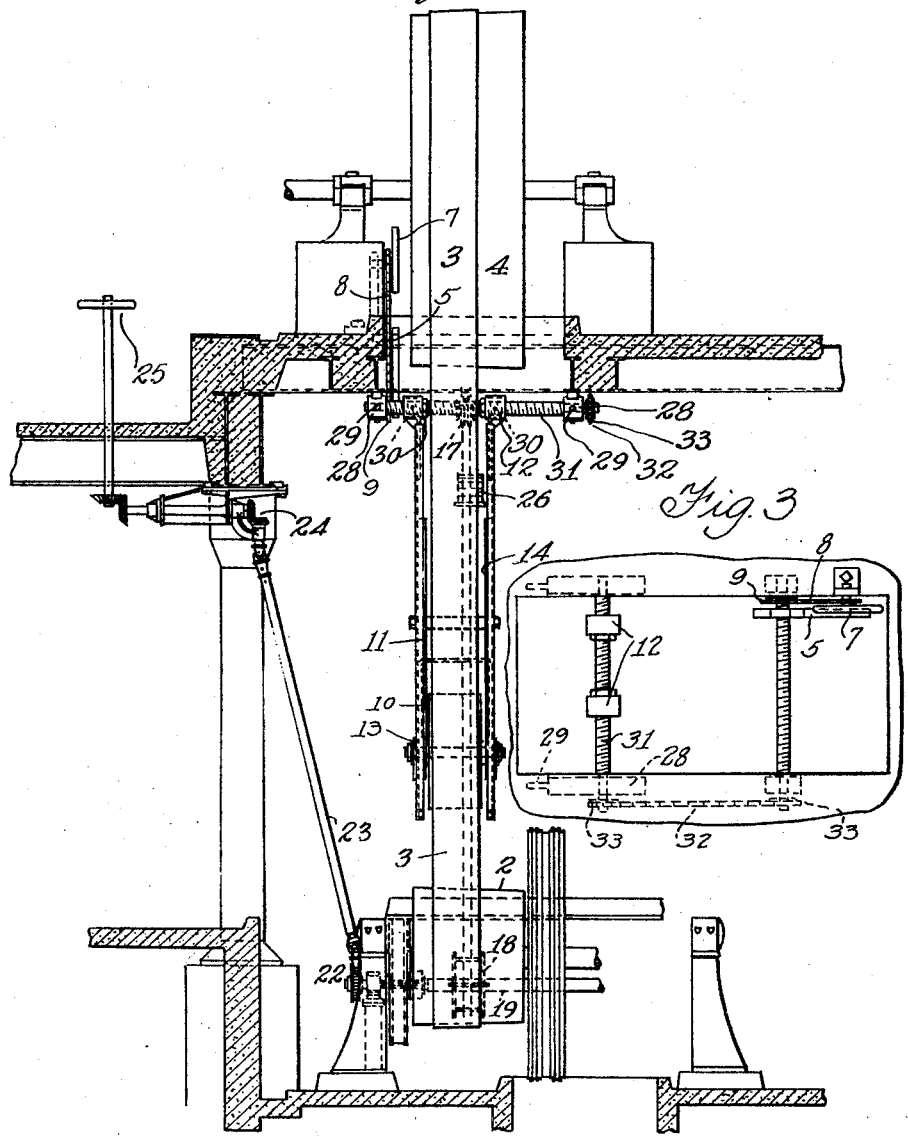

Patented July 31, 1928.

1,678,645

UNITED STATES PATENT OFFICE.

HORACE C. McEWEN, OF IROQUOIS FALLS, ONTARIO, CANADA.

BELT TIGHTENER.

Application filed January 14, 1926. Serial No. 81,213.

This invention relates to a belt tightener exemplified in the form of an idler pulley bearing upon the belt by gravity to keep the belt in taut operative frictional engagement with the driving and driven pulleys, an object of the invention being to provide means whereby the location of the centre of gravity of the idler may be varied with respect to the surface of the belt upon which the idler then bears to vary the effective weight of the idler against the belt and adjust the tension of the latter in accordance with predetermined requirements.

Another object is to provide a belt tightening construction combining a belt shifter and a tightener with a support travelling in unison with and parallel to the shifter in the longitudinal line of the pulley and also adjustable transversely of the pulley.

Another object is to improve the general construction of belt shifters of this type.

The above with further objects and advantages will be hereinafter more fully described in the following description and particularly pointed out in the appended claims.

For full comprehension however of my invention reference should be had to the accompanying drawings forming a part of this specification in which the same reference characters indicate the same parts and wherein:

Fig. 2 is an end view thereof.

Fig. 3 is a plan view of the belt shifter and tightener support, taken on line 3—3—Fig. 1.

Figure 1:
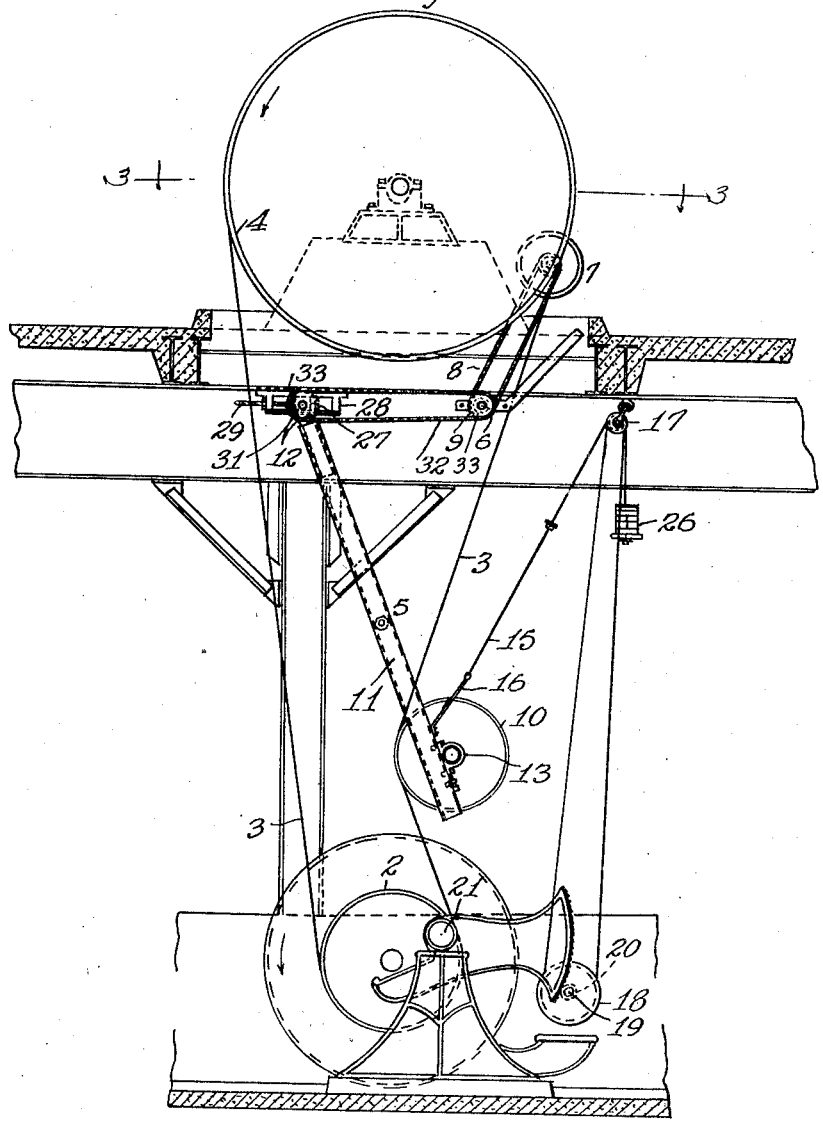
Fig. 1 is a side elevation of my improved belt tightener and shifting device.

For illustrative purposes I have shown my device as applied to the belt drive of a Walmsley paper machine, 2 indicating the cone drive pulley connected by belt 3 to the cone driven pulley 4, it being understood that the device may be used with any desired belt drive employing straight or cone pulleys.

The belt shifter illustrated comprises the shifter proper 5 straddling the belt and mounted to travel upon a worm 6 suitably supported longitudinally of and preferably just beneath the driven pulley 4, the worm being rotated to move the shifter and through it the belt longitudinally across the face of the pulley and parallel with the longitudinal line thereof, the rotation of the worm being effected by a hand wheel 7 operatively connected to the worm by chain 8 and sprockets 9.

The belt tightener comprises an idler pulley 10 suspended between the pulleys 2 and 4 upon the free lower end of a hanger 11 pivoted at its upper end at 12 to swing freely, the hanger being preferably formed of two parallel metallic arms which flank the belt and extending outside the latter have bearings 13 upon their lower ends between which the idler is rotatably mounted to bear upon the outer side of the belt. Cushions 14 of wood or other suitable material are mounted upon the inner surfaces of the hanger arms to avoid abrasion of the belt.

The hanger 11 may be swung to bring the idler into or out of contact with the belt by means of a cable 15 attached at 16 to the lower end of the hanger and passing upwardly over a double sheave 17 and downwardly to a drum 18 keyed to a shaft 19. The shaft 19 has a pinion 20 mounted thereon in position to be engaged by a segmental rack carried by a shaft 21 operatively connected by worm gear 22, shaft 23, bevel gear drive 24, to hand wheel 25 whereby the idler is raised or lowered out of or into engagement with the belt. To facilitate this adjustment of the idler, the cable 15 is continued up from the drum 18 over the sheave 17 and has a counterpoise 26 suspended therefrom.

When bearing upon the belt the idler tensions the latter and operatively connects the driven to the drive pulley but with a fixed suspension for the idler such tension is standard and not capable of variance to meet different load needs. To overcome this defect and produce an adjustable belt tightener capable of producing varying belt tensions as required I have made the idler support adjustable so that the centre of gravity of the idler can be shifted with respect to the surface of the belt engaged by the idler, it following that, as seen in Fig. 1, the farther the suspension point 12 of the idler hanger is disposed away from (to the left as shown) the right hand flight of the belt the greater distance the idler has to travel to assume centre of gravity and consequently the greater force with which it bears upon the belt and vice versa. Thus adjustment of the suspension point of the idler produces an adjustment in the tension of the belt and to secure this adjustment the upper pivoted ends of the idler support are connected to slide blocks 27 mounted in runways disposed transversely to the axis of the pulley or the path taken by the belt in being shifted. These runways are presented by suitably supported brackets 28 through which adjusting screws 29 attached to the blocks, protrude for manipulation to move the blocks along the runways and so effect the desired adjustment in the tension of the belt.

As just described the belt tightener support is adjustable transversely of the pulley and in order that the tightener can, in addition, be moved in unison with the shifter, the upper ends of the hanger support arms are pivotally supported by tapped nuts 30 engaging a worm 31 threaded the same as worm 6 and bearing at its ends in the blocks 27 so as to be movable therewith, the bearing ends of the worm constituting the connection between hanger arms and slide blocks. The worm 31 is connected to worm 6 by chain 32 and sprockets 33 so that when the belt shifter 5 is moved to shift the belt, the tightener is moved in unison therewith parallel to the longitudinal centre line of the driven pulley and consequently always maintains a constant tension of the belt and at the same time materially reduces the friction between the belt shifter and edge of the belt as undue side strain is avoided. When the distance between the worms 6 and 31 is lessened during the adjustment just described, the lower flight of chain 32 sags and the upper flight maintains the straight operative position as is usual in sprocket chain drives.

The above described arrangement avoids elaborate construction and by its inclusion of belt tightener support movable both longitudinally and transversely of the pulley, provides for the most desirable combination of belt tightener with adjustable tension and movable in unison with the belt shifter.

What I claim is as follows:

1. The combination with a pulley and a belt for driving the pulley, of a belt tightener adapted to tension the belt, and a pivotal support for the tightener movable parallel with the axis of the pulley and also movable transversely with respect both to the axis of the pulley and the belt surface engaged by the tightener.

2. The combination with a pulley and a belt for driving the pulley, of a belt shifter for moving the belt longitudinally over the face of the pulley and a pivoted belt tightener movable in unison with the shifter, the pivot point of the tightener being adjustable transversely with respect both to the axis of the pulley and to the belt surface engaged by the tightener.

3. The combination with a pulley and a belt for driving the pulley, of an idler bearing upon one surface of the belt, a hanger upon the lower end of which the idler is mounted, a support for the upper end of the hanger, such support being movable parallel with the axis of the pulley and also movable transversely with respect both to the axis of the pulley and to the belt surface engaged by the tightener, and a pivotal connection between the hanger and support.

4. The combination with a pulley and a belt for driving the pulley, of a belt shifter engaging the belt, a worm disposed longitudinally of the pulley and having the belt shifter mounted thereon to travel along its length, an operating gear to rotate the belt shifter worm, a hanger, an idler mounted upon the lower end of the hanger and bearing upon one surface of the belt, a worm disposed parallel with the belt shifter worm and having the upper end of the hanger pivotally mounted thereon to travel along its length, bearings for the hanger worm, such bearings being adjustable transversely of the pulley and an operative connection between the worms to move the belt tightener in unison with the belt shifter.

5. The combination with a pulley and a belt for driving the pulley, of an idler bearing upon one surface of the belt to tension the latter, a hanger pivoted at its upper end and carrying the idler at its lower end, the pivotal connection of the hanger being movable transversely of the pulley and means for swinging the hanger to raise the idler from the belt or lower it into engagement therewith, such means comprising a cable connected to the hanger, a drum over which the cable is passed and an operating gear for rotating the drum to move the cable.

6. The combination with a pulley and a belt for driving the pulley, of an idler bearing upon one surface of the belt to tension the latter, a hanger pivoted at its upper end and carrying the idler at its lower end, the pivotal connection of the hanger being movable transversely of the pulley and means for swinging the hanger to raise the idler from the belt or lower it into engagement therewith, such means comprising a cable connected to the hanger, a drum over which the cable is passed, an operating gear for rotating the drum to move the cable.

7. The combination with a pulley and a belt for driving the pulley, of a belt shifter engaging the belt, a worm disposed longitudinally of the pulley and having the belt shifter mounted thereon to travel along its length, an operating gear to rotate the belt shifter worm, a second worm disposed parallel to the belt shifter worm, runways at opposite ends of the second mentioned worm and disposed transversely to the pulley, bearing blocks slidably mounted in said runways and having the opposite ends of the adjacent worm supported thereby, adjusting screws for varying the position of the bearings along the runways, tapped nuts upon the second mentioned worm, hanger arms flanking the belt and having their upper ends pivotally mounted upon said nuts, an idler mounted upon the hanger arms at their lower ends and bearing upon the belt and an operative connection between the worms whereby the latter are operated in unison and the idler moved with the belt shifter longitudinally of the pulley.

In testimony whereof, I have signed my name to this specification.

HORACE C. McEWEN.